UNITED STATES PATENT OFFICE.

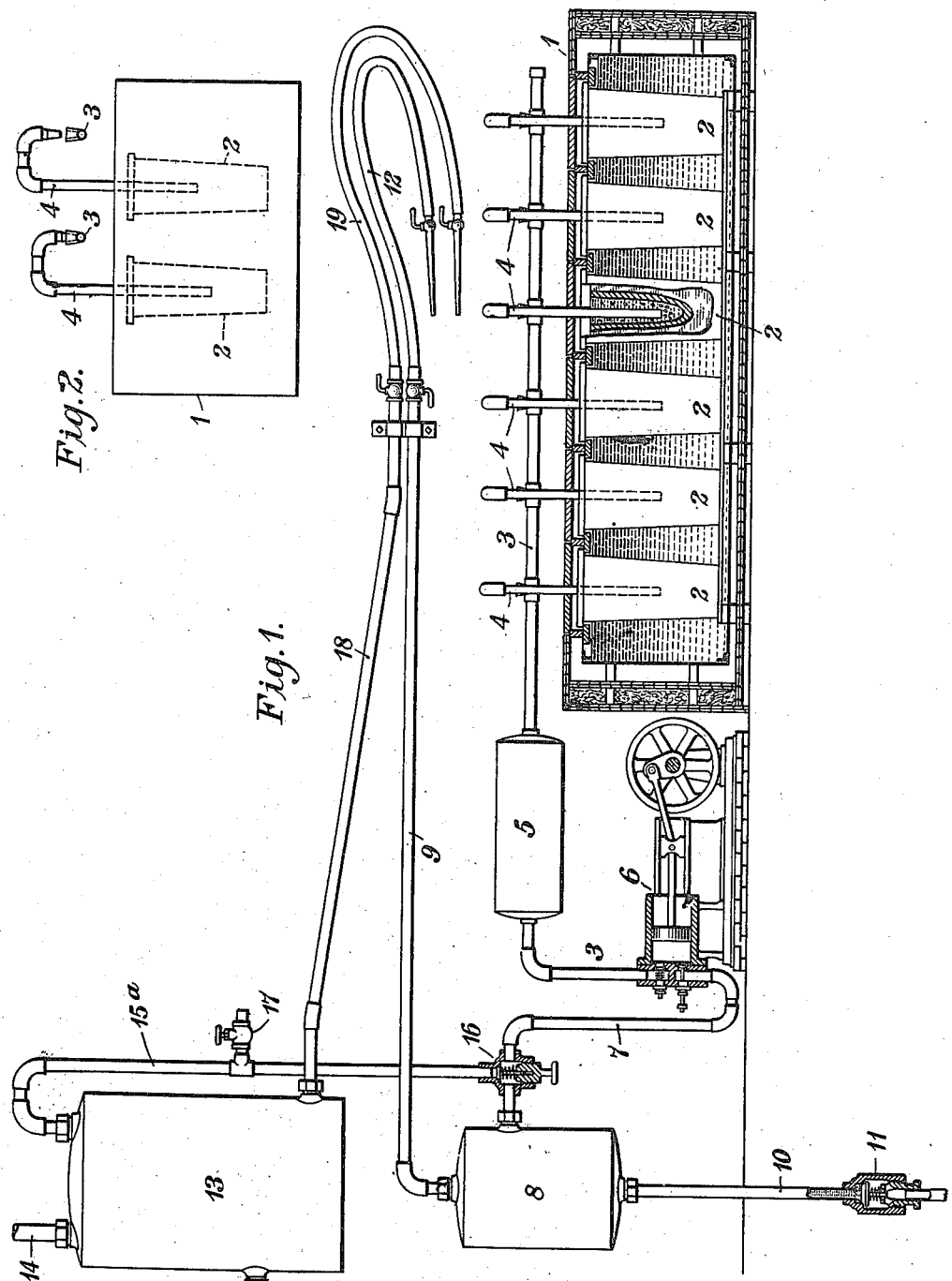

JAN STEYNIS, OF NEW YORK, N. Y., ASSIGNOR TO STEYNIS OZONE COMPANY, A CORPORATION OF NEW YORK.

APPARATUS FOR ICE-MAKING PLANTS.

1,068,608. Specification of Letters Patent. Patented July 29, 1913.

Application filed November 24, 1911. Serial No. 662,094.

*To all whom it may concern:*

Be it known that I, JAN STEYNIS, a subject of the Queen of the Netherlands, residing in the city, county, and State of New York, have invented certain new and useful Improvements in Apparatus for Ice-Making Plants, of which the following is a clear and complete disclosure.

My invention relates to ice making plants adapted to make what is known to the trade as "can ice." In plants of this kind heretofore constructed it has been customary to provide a freezing or refrigerating tank containing a plurality of cans with means for forcing compressed air up through the water in the cans while undergoing freezing. The compressed air has usually been supplied by an air compressor or pump of any usual construction and a separate pump has usually been provided to create a vacuum for use in drawing off the impure water which collects at the center of the block after the larger portion of the water has frozen.

One object of my invention is to so arrange and construct a system of this kind that a single pump may be used for supplying the necessary compressed air and for creating a vacuum which may be used in drawing off the impure water.

Further objects of my invention are to provide means for sterilizing the water while undergoing freezing; to simplify the apparatus; and to so arrange the different parts that less attendance will be necessary than has heretofore been required.

Other objects and advantages of my invention will be obvious from the following specification.

In the drawing accompanying and forming a part of this specification I have illustrated the preferred construction and arrangement of my improved apparatus.

In this drawing Figure 1 is a side elevation of that portion of an ice making plant with which my improvements are concerned. Fig. 2 is an end elevation of the freezing tank shown in Fig. 1.

Referring in detail to the apparatus shown in this drawing, numeral 1 designates a freezing tank containing a plurality of cans 2. These cans are arranged in rows in the usual way and above and at the side of each row there is provided a compressed air main, 3, having a plurality of removable extensions 4, one of which is arranged to extend down into each of the cans so as to force compressed air through the water while undergoing freezing. The compressed air, when so supplied, bubbles up through the water undergoing freezing and causes the coarser impurities to accumulate at the center of the block. One of the cans is shown broken away with the water therein frozen except at the center. The cake or block is in condition to have the impure water at the center removed and the resulting cavity filled with pure water prior to completing the block. The compressed air mains 3, above referred to, pass through a drying chamber 5, which may be of any well-known construction. The function of this drying chamber is to remove moisture from the compressed air in order that the same may not be deposited and accumulate as frost in the pipes 3 and extensions 4. The numeral 6 designates a single acting pump, the delivery side of which is connected to the compressed air mains 3. The intake side of the pump communicates through a conduit 7 with a vacuum tank 8. A suction main 9 opens into the top of the tank 8 and the water discharge conduit 10 is connected to the lower side of this tank. A spring-pressed check valve 11 is placed in the water discharge pipe and is so adjusted that with the required vacuum in the tank 8, the weight of the water in the conduit 10, when it has reached a predetermined height, will open the check valve 11 and allow the water to automatically escape as it is discharged into the tank 8 by the suction main 9. The suction main 9, at its outer end, terminates in a flexible hose 12, for use in drawing off the impure water which accumulates at the center of the blocks.

The numeral 13 designates a water sterilizing tower of the kind wherein raw water is admitted at an opening, 14, and allowed to travel downwardly in the tower, which is filled with pebbles or similar material and is brought in contact with ozone or ozonized air introduced at an opening 15. In practice it is found that after the ozone has passed up through the sterilizing tower there is still left a considerable percentage of useful ozone and according to my present invention this useful ozone is drawn into a conduit 15ª, which opens through the spring-pressed and adjustable valve 16 into the conduit 7, connected with the intake side of the pump. The ozone conduit 15ª is provided with an air intake 17 through which any shortage of air necessary for the system may be supplied.

The numeral 18 designates a pipe or conduit for supplying sterilized water to the cans and can be used for filling the cans and for supplying pure water to fill the cores.

With the apparatus as above constructed and arranged, the operation is as follows: The cans are filled with sterilized water by means of the hose 19 connected with the conduit 18 and the pump 6 is put in operation so as to force compressed air sterilized by an admixture of ozone through the water in the tanks while undergoing freezing. The pump also creates a vacuum in the tank 8 which is employed as soon as the water in any of the cans is frozen to draw off the impure water at the center of the block. The impure core water is drawn through the main or conduit 9 into the tank 8, from which it flows by gravity into the pipe 10 and is discharged. The valve 16 is adjusted so that the pump will at all times maintain the required vacuum in the tank 8. This vacuum need not be high, a vacuum of 4 or 5 lbs. being sufficient. In the practical operation of a plant of this kind, the cans individually or in groups are filled and frozen in rotation, therefore the pump 6 may be kept constantly in operation. The operator periodically fills each tank or group of tanks with water, draws off the resultant impure water at the center of the blocks as they freeze, fills the cavities with pure water and removes the blocks. The ozonized air supplied by the compressor not only causes the coarser impurities to collect at the center of the block by agitating the water but also sterilizes the water while undergoing freezing and insures the destruction of any organic impurities should there be such in the water after having passed through the filter 13. Since only a small vacuum is required to remove the impure water and only a small amount of pressure is required to force the ozonized air through the water in the cans, a single pump can be used for both purposes when arranged in the manner described above. When so used it cheapens the initial cost of the apparatus and requires less attention than would two separate pumps when used for performing these functions.

Any suitable apparatus and method for producing ozone may be used in connection with the apparatus above described, though I prefer to use the apparatus and method described in my Patents Nos. 924,592 and 906,081.

The construction of the sterilizing tower 13 forms no part of my present invention and I therefore have not described the construction of this device. There are now numerous well-known devices of this kind and any of them may be used in practising my invention.

While I have illustrated and described only one arrangement of my improved apparatus, I am aware that this arrangement and the details thereof may be varied by those skilled in the art without departing from the scope of my claims.

What I claim is:

1. In apparatus of the kind described, a suction main, a vacuum chamber connected with said main and a downwardly extending gravity actuated water discharge pipe leading from said vacuum chamber, having a check valve therein, substantially as described.

2. In apparatus of the kind described, a freezing tank containing a plurality of cans, a compressed air main with branches extending into said cans, an ozone sterilizing tower, a pump connected with said compressed air main, an ozone discharge conduit leading from said tower and communicating with the intake side of said pump and having an air inlet therein and a suction main connected with the intake side of said pump, substantially as described.

3. In apparatus of the kind described, a freezing tank containing a plurality of cans, a compressed air main with branches extending into said cans, an ozone sterilizing tower, a pump connected with said compressed air main, an ozone discharge conduit leading from said tower and communicating with the intake side of said pump and having an air inlet therein and a suction main communicating with a vacuum chamber and connected to the intake side of said pump, substantially as described.

4. In a system of the kind described, a freezing tank containing a plurality of cans, an ozone tower, a pump, an ozone conduit with an air intake therein leading from said tower to said pump and a conduit with extensions leading from said pump to said cans, substantially as described.

5. In an apparatus of the kind described, comprising a freezing tank with a plurality of cans in said tank, a pump adapted to deliver compressed air to said cans, a vacuum chamber connected with the intake side of said pump and communicating through a suction main with a hose adapted to remove impure water from said cans, substantially as described.

Signed at New York, State of New York, this 23rd day of November 1911.

JAN STEYNIS.

Witnesses:
 WALTER S. JONES,
 R. M. RICKETTS.